Nov. 21, 1967 V. VALI ETAL 3,354,311

FRINGE MOVEMENT DETECTOR INCLUDING DUAL PHOTOCELLS

Filed Aug. 23, 1965 2 Sheets-Sheet 1

INVENTORS.
VICTOR VALI
REUBEN S. KROGSTAD
ROBERT W. MOSS
RONALD L. HAGMAN

Orland M. Christensen
ATTORNEY

# United States Patent Office 3,354,311
Patented Nov. 21, 1967

3,354,311
FRINGE MOVEMENT DETECTOR INCLUDING DUAL PHOTOCELLS
Victor Vali and Reuben S. Krogstad, Seattle, Robert W. Moss, Mercer Island, and Ronald L. Hagman, Renton, Wash., assignors to The Boeing Company, Seattle, Wash., a corporation of Delaware
Filed Aug. 23, 1965, Ser. No. 481,697
13 Claims. (Cl. 250—204)

ABSTRACT OF THE DISCLOSURE

A system for detecting and counting the movement of a radiant energy interference pattern is disclosed. Radiant energy detecting means is disclosed as mounted on a movable support and in a predetermined portion of the pattern. As the pattern attempts to move relative to the detector means a high gain servo loop moves the support in a direction to reduce such relative movement. The support drive signal thus is proportional to the fringe movement. Limit switches are actuated when the movement corresponds to a complete fringe shift so that the mount is returned to its initial position and a counter is actuated. In another embodiment the deflection plates of an oscilloscope are operated on by signals from detectors to provide a rotating line of light having an angular position proportional to pattern movement.

---

Interferometers have long been used for determining the extent of relative movement between two points. Interferometer techniques making use of a laser have recently been used in an entirely new manner for detecting relative movement between two points on the surface of the earth so that the earth tides and oscillations can be studied. In other fields interferometer techniques are utilized for detecting relative movement between any two selected objects by having the two mirrors of an interferometer connected to the two points of interest so that information concerning movement of the objects can be obtained by observing the changes in the resulting interference pattern. In these and other systems wherein interference patterns of electromagnetic energy such as visible light are used, it is important to be able to count the actual number of fringe shifts which occur as well as to be able to detect and determine the extent of a partial fringe shift. In the use of such equipment for measuring the strain of the earth's crust it would be most advantageous to have the ability to automatically record fringe shifts or partial fringe shifts so that unmanned detection stations could be established in remote areas. One way of achieving such a system is through the use of equipment adapted to provide electrical signals representing complete fringe shifts as well as partial fringe shifts and with the electrical signals being of a type which are readily converted into a usable intelligence record.

It is therefore an object of the present invention to provide a novel system for detecting movement of an interference pattern produced by interfering beams of radiant energy. It is another object of the present invention to provide a novel system for detecting and counting the fringe shifts in an interference pattern produced by an interferometer. A further object of the present invention is to provide a simplified and highly accurate system for determining complete fringe shifts in the interference pattern of an interferometer as well as for determining the extent of a partial fringe shift. An additional object of the present invention is to provide a system for detecting and counting complete and partial fringe shifts in the interference pattern of an interferometer used for detecting relative movement between separated points on the crust of the earth. A further object of the present invention is to provide a geophysical strain measuring system making use of interferometer techniques in combination with an improved system for detecting and counting complete and partial fringe shifts caused by relative movement between two separated points on the crust of the earth.

The above as well as additional objects of the present invention are achieved through the use of a system which includes a pair of radiant energy detecting devices positioned on a movable support means to receive radiant energy from predetermined portions of the interference pattern. In one embodiment of the invention the two detectors are connected in a bridge circuit arrangement so that when the fringe pattern is stationary (corresponding to no relative movement between the mirrors of the interferometer) the output signal from the bridge circuit is zero. A high gain feedback servo loop is coupled with the bridge circuit and with the detector support means so that if the fringe pattern produced by the interferometer undergoes a shift the detector support means will be moved in a direction to reduce the bridge circuit output signal to a minimum by maintaining the two detectors in the initial positions relative to the interference patterns. Thus the detectors are effectively moved in a direction to follow movement or "shifting" of the interference pattern. The system arrangement is such that the driving signal for movement of the detectors is directly proportional to the shift which has occurred in the fringe pattern. By having the two detectors properly positioned with respect to the fringe pattern, and by having limit switches positioned for operation by the detector support when the same has undergone a predetermined extent of movement, the detector support is automatically returned to an initial position. In one system the movement of the detectors corresponds to one complete fringe shift so that a sawtooth output voltage is produced having an amplitude which is directly proportional to one half of the wavelength of the light being used in the interferometer. Due to the sawtooth characteristic of the voltage, conventional counter means are readily operated for providing an accurate count of complete and partial fringe shifts. Since the amplitude of the output voltage is linearily related to wavelength, a digtal volt meter coupled with the output circuit of the servo system is readily calibrated for direct reading of partial fringe shifts in terms of distance.

In accordance with a further embodiment of the present invention the fringe pattern from the interferometer is effectively observed by a pair of photomultiplier tubes coupled for control of the horizontal and vertical deflection plates of an oscilloscope in a manner such that a radial line sweeps circularly about the scope face. The angular position of the line is monitored by a third photomultiplier tube which views the scope face through a linear spiral mask so that a sawtooth voltage proportional to fringe shift is produced for control of a recorder.

The invention will be more clearly understood from the following description when read with reference to the accompanying drawings wherein, FIGURE 1 is a block diagram of a laser interferometer adapted for use in detecting and measuring relative movement between two separated points on the crust of the earth;

Figure 1:
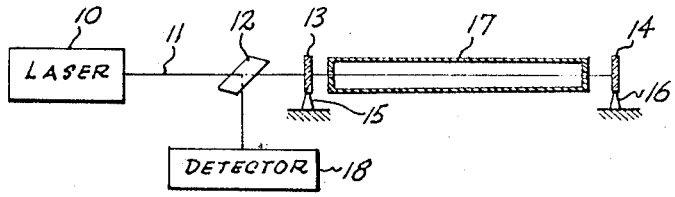

Referring now to the drawings and particularly to FIGURE 1 there is shown a laser interferometer system used for detecting and measuring relative movement between two displaced points on the surface of the earth. The equipment shown in FIGURE 1 includes a laser 10 for providing a monochromatic beam of light 11 which passes first through a beam splitter 12 and thence to the interferometer mirrors 13 and 14 which are respectively secured to the crust of the earth at 15 and 16. A constant density path for the travel of the beam between the two mirrors is provided by the evacuated chamber 17 positioned between mirrors 13 and 14. The mirror 14 is 100% reflecting and is concave with a radius of curvature substantially equal to the distance between the two mirrors. The mirror 13 is only partially reflective, as for example 40% reflecting. The ends of the constant density tube are anti-reflection coated for the wavelength of energy being used.

Figure 2:
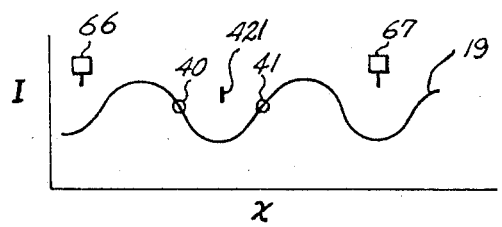
FIGURE 2 is a graph of the intensity variation of an interference pattern produced by the interferometer of FIGURE 1 for the case of one reflection from each mirror and also showing the relative positioning of system components with respect thereto.

Detector means 18 is positioned for receipt of the light directed thereon by the beam splitter 12 after the same has been reflected from mirrors 13 and 14. As is well known in the interferometer art, the resulting pattern of light focused on the detector 18 will be an interference pattern composed of alternate light and dark areas produced by the interference which occurs between the beams of light being directed thereon of the same wavelength. The graph in FIGURE 2 illustrated by the line 19 represents the intensity variation of the interference pattern produced by the apparatus of FIGURE 1 for the case of one reflection from each mirror. It will be seen that the graph is sinusoidal with:

$$I = I_1 + I_2 + 2(I_1 I_2)^{1/2} \cos \theta \qquad (1)$$

where $I_1$ and $I_2$ are the intensities reflected from mirrors 13 and 14, respectively, $\theta$ is the phase angle, where $$\theta = 2\pi n x / \lambda_0$$

where $\lambda_0$ is the laser wavelength in vacuum, $n$ is the index of refraction, and $x$ is the distance change between mirrors 13 and 14 starting from an arbitrary point.

The equipment illustrated in FIGURE 1 for detecting relative movement between separated points on the surface of the earth does not per se constitute the present invention, but is used to show one of the preferred uses for the teachings of the present invention. It should be noted that an interferometer of the Michelson type could be used as effectively as one of the Fabry-Perot or some other type. The factor of importance to the system of the present invention is that an interference pattern of radiant energy is produced so that shifting of the pattern can be detected and measured.

Figure 3:
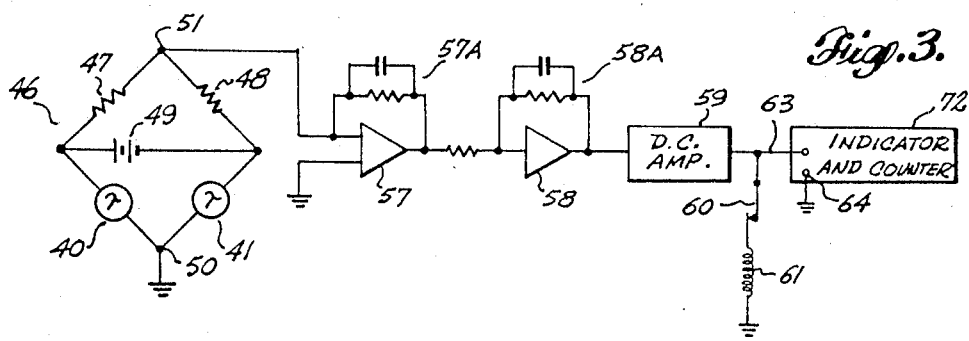
FIGURE 3 is an illustration of the electronic components connected to provide one system of the present invention.
Figure 4:
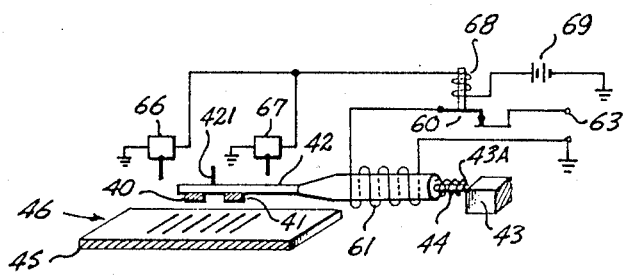
FIGURE 4 is a schematic circuit diagram in partial diagrammatic illustration of the support system for the detectors of the system of FIGURE 3.

Referring now to FIGURES 3 and 4 the detail of a preferred embodiment of the present invention will be described in detail. It will be seen in FIGURE 4 that two photodetectors 40 and 41 are mounted on a movable carrier 42 which is supported for movement in FIGURE 4 by means of a support member 43 and associated rod 43A received by the carrier 42. A coil spring 44 yieldingly urges the holder 42 toward a rest position such that the detectors 40 and 41 are positioned on opposite sides of a "dark line" in the interference pattern as shown in FIGURE 2. For purpose of illustration there is shown in FIGURE 4 a planar surface 45 on which a fringe pattern 46 is diagrammatically illustrated. There are certain advantages to having detectors 40 and 41 positioned with respect to the maxima and minima of the fringe pattern as illustrated in FIGURE 2, wherein it will be seen that the detectors 40 and 41 are positioned with a phase separation of 180° and each being midway between a maximum and minimum point on the intensity curve. This corresponds to the detectors 40 and 41 being positioned on opposite sides of a dark line and partially exposed to light from the adjacent light sections of the interference pattern. Thus the output signals from the two detectors are readily adjusted to be equal for the positions shown in FIGURE 2. Therefore if the fringe pattern represented in FIGURE 2 is shifted to the left or to the right one of the detectors is subjected to light of increasing intensity while the intensity of the light applied to the other is simultaneously decreased. As a result the output signal from one detector increases in amplitude while the other decreases in amplitude and hence very small movements of the fringe pattern are readily detected.

Referring to FIGURE 3 it will be seen that the detectors 40 and 41 are connected in a bridge circuit arrangement 46 which includes the resistors 47 and 48 as well as a source of DC potential 49. The circuit arrangement is such that the voltage existing between points 50 and 51 will be proportional to the difference in resistance of the detectors 40 and 41. In the system illustrated in FIGURE 3 the detectors 40 and 41 are shown as being of the type undergoing a variation in resistance, such as typified by cadmium selenide (CdSe), but it should be noted that various other types of detectors could be used in accordance with the concepts of the present invention.

Output signals from the bridge circuit 46 are applied to a first operational amplifier 57 having its signal output circuit coupled as an input circuit for a second operational amplifier 58. Each has a conventional feedback and filter circuit 57A and 58A. The output signal from the second amplifier 58 is applied to a DC amplifier 59 which in turn is directly connected through the switch 60 to a driving coil 61 which as seen in FIGURE 4 is adapted to cause movement of the support member 42 on which the detectors 40 and 41 are carried. The arrangement is such that the output signals from the DC amplifier 59 will drive the coil 61 so that the detectors will be moved in the proper direction to reduce the signal from the bridge circuit 46. The detectors 40 and 41 are therefore moved in response to any shifting of the fringe pattern so that their position relative to the pattern remains as shown in FIGURE 2. Thus a feedback system is provided which serves to constantly reduce the output signal from the bridge circuit 16 to zero, with the driving signal for coil 61 which is required to maintain the output signal from the bridge circuit 46 at zero being proportional to the fringe shift which has occurred. Therefore the output signals provided on the output terminals 63 and 64 are directly proportional to the fringe shift which has occurred. As described below, the output voltage will be sawtooth in form as shown in FIGURE 5.

It will be seen in FIGURE 4 that the carrier 42 for the detectors 40 and 41 has a switch operating member 421 extending upwardly therefrom. This is adapted to operate the limit switches 66 and 67 which are each connected in series circuit with an operating coil 68 positioned for controlling the switch 60. A source of DC potential illustrated as the battery 69 is connected to the operating coil 68 with the arrangement being such that if either of the limit switches 66 or 67 is operated a circuit will be closed for energization of the coil 68 and hence the switch 60 will be opened. When the switch 60 is opened the coil 61 is no longer energized and hence the member 42 will be moved back toward its initial position by means of the restoring spring 44. As seen in FIGURE 2 the limit switches 66 and 67 are each disposed one complete fringe shift away from the switch actuating member 421 so that when the support member 42 has been displaced in either direction by one fringe shift one or the other of the limit switches will be operated and as a result serve to de-energize the driving coil for the support member 42. As a result the support member 42 will be mechanically urged to return to its original position with the detectors 40 and 41 positioned on opposite sides of the next following dark line. The dynamics of the system is such that the switch 60 closes at about the time the detectors are approaching their initial position and therefore the signal feedback system takes over to effectively drive the member 42 to the original position wherein the detectors 40 and 41 are in the positions illustrated in FIGURE 2 with respect to the fringe pattern 19. Thus it will be seen that the movement of the detectors will correspond exactly to one fringe shift. As is well known in the interferometer art, relative movement between the two mirrors (when a single reflection from each mirror is used) required for one fringe shift is equal to a change in distance of one half the wavelength of the light being used, or $\lambda/2$ where $\lambda$=wavelength. Hence the amplitude of the voltage in the sawtooth voltage waveform illustrated in FIGURE 5 will be proportional to one half of the wavelength of the beam of light provided by the laser 10. In FIGURE 5 it will be seen that the voltage across the coil 61 when the detectors are in their initial or starting position is considered as zero, and that the voltage then increases from zero in one direction for movement of the detectors in one direction, and that the voltage increases from zero in the opposite (or negative direction) when the detectors are moved in the opposite direction. The voltage returns to zero in each case when one of the limit switches 60 or 67 is operated.

Figure 5:
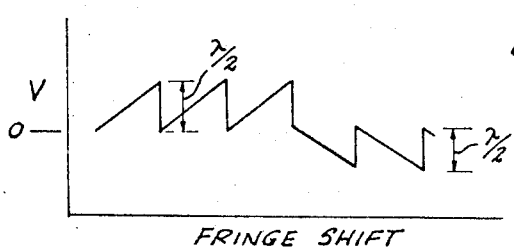
FIGURE 5 is a graph of the output voltage provided to the indictor and counter assembly of FIGURE 3.

Due to the abrupt change in the voltage as provided by the sawtooth voltage waveform of FIGURE 5 the output signals on the terminals 63 and 64 lend themselves well to operation of conventional counters. Thus in the system of FIGURE 3 the terminals 63 and 64 are coupled with the indicator and counter unit 72. The unit 72 preferably includes first and second voltage sensitive counters respectively responsive to the positive and negative going peaks of the sawtooth voltage so that separate counts are made of the fringe shifts resulting from movement of mirrors 13 and 14 toward and away from each other. A third counter is then provided to indicate the net movement. Since the voltage on the slanting portion of the waveform is linear with respect to distance, a direct reading voltmeter is used to indicate partial fringe shifts.

Figure 6:
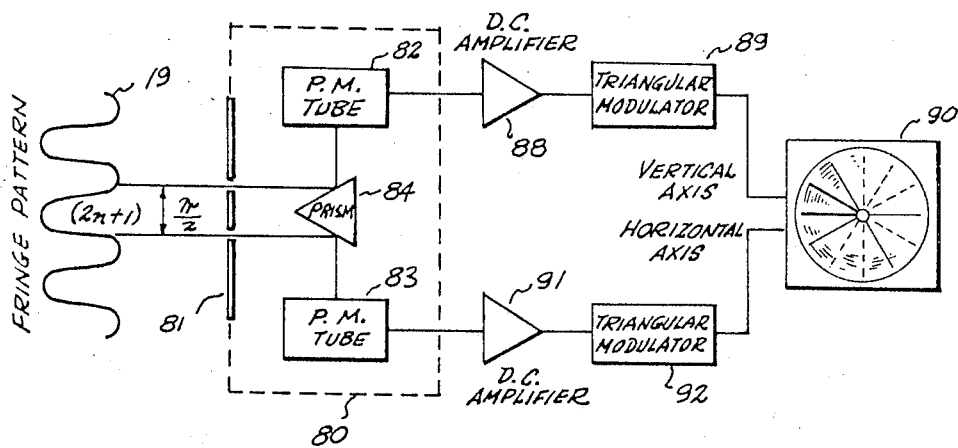
FIGURE 6 is a block diagram of a further embodiment making use of stationary detectors and associated readout equipment for detecting the extent of shifting of the fringe pattern produced by the interferometer.
Figure 7:
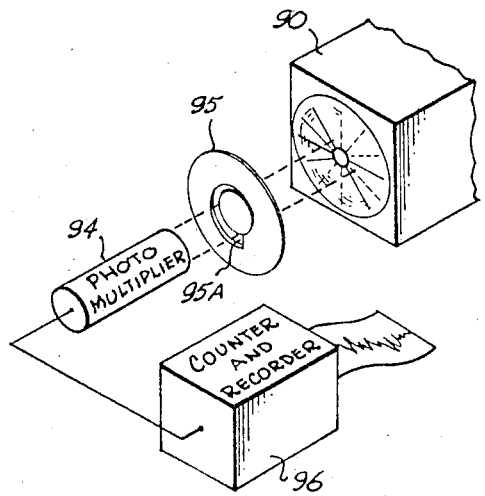
FIGURE 7 is a block diagram of apparatus used in combination with the system of FIGURE 6 for providing an accurate record of output signals therefrom.

In the embodiment of the invention shown in FIGURE 6 a detection system 80 which includes an adjustable double slit system 81 and photomultiplier tubes 82 and 83 on opposite sides of a prism 84 is adapted to provide signals from the fringe pattern 19. The slit system and prism serves to focus energy on the photomultiplier tubes from areas of the fringe pattern having a phase separation of $$(2n+1)\frac{\pi}{2}$$

It can be shown by the preceding equation for $\theta$ that the output from one photomultiplier tube corresponds to Cos $\theta$ and the other to Cos $(\theta \pm 90°)$. If one of these signals is applied to the horizontal axis and the other to the vertical axis of an oscilloscope, the trace is a circular Lissajous figure, each revolution of which denotes the shift of one fringe. In the system of FIGURE 6 the "P.M." tube 82 is coupled through a D.C. amplifier 88 and triangular modulator 89 to the deflection control for the vertical axis of an oscilloscope 90, and the P.M. tube 83 is coupled through the D.C. amplifier 91 and triangular modulator 92 to the horizontal axis control for the oscilloscope. Thus through the use of input signals which are amplitude modulated triangularly the scope pattern is a radial line sweeping circularly. The angular position of this line (angle $\theta$) is monitored by a third photomultiplier tube 94 positioned to view the scope face through a linear spiral mask 95 having a light transmitting slot 95A which has a linear relationship between width and angular position thereof. Output signals from the tube 94 are thus sawtooth in nature and are applied to the counter and recording apparatus 96. In one system fringe displacement of less than 1/100 fringe are easily resolved.

There has been disclosed an improved apparatus for detecting relative movement between separated points on the earth making set of a laser interferometer and the fringe movement detection and counting systems of the present invention. While the invention has been described with reference to specific embodiments, it is to be understood that the same was done for purpose of teaching the invention and that it is intended that those modifications which become obvious to a person skilled in the art from the teachings hereof will be encompassed by the following claims.

What is claimed is:

1. A system for detecting relative movement between two points comprising in combination: an interferometer including first and second mirrors respectively secured to said points and including means providing an interference pattern of radiant energy reflected from said mirrors with the displacement of said pattern being proportional to relative movement between said points; radiant energy detection means positioned with respect to said pattern to provide first and second signals respectively proportional to the intensity of first and second predetermined portions of said pattern; movable support means holding said detection means for movement; and means responsive to said first and second signals to provide an output signal having an amplitude proportional to the displacement of said pattern including drive means coupled with said support means and responsive to said first and second signals to move said support means in a direction to follow displacement of said pattern, and support return means returning said support means to an initial position after said pattern and support means have undergone a predetermined extent of movement.

2. A system for detecting relative movement between two points comprising in combination: an interferometer including first and second mirrors respectively secured to said points and including means providing an interference pattern of radiant energy reflected from said mirrors with the displacement of said pattern being proportional to relative movement between said points; radiant energy detection means positioned with respect to said pattern to provide first and second signals respectively proportional to the intensity of first and second predetermined portions of said pattern; and means responsive to said first and second signals to provide an output signal having an amplitude proportional to the displacement of said pattern including an oscilloscope, amplification and signal modulation means coupled with the horizontal and vertical beam controls of said oscilloscope and responsive to said first and second signals to provide a rotating line of light on the face of said oscilloscope with the angular position thereof being proportional to the movement of said pattern, and means responsive to the angular position of said line of light to provide said output signal.

3. A system as defined in claim 2 wherein said last-named means includes photo detector means and a mask disposed between said photo detector means and said oscilloscope, said mask having a spiral light transmitting opening with the width of the opening being a function of the angular position of each portion thereof.

4. A system as defined in claim 1 wherein: said detection means includes first and second photo detectors; said movable detector support means positions said detectors between different maximum and minimum points of light intensity of said pattern such that as said pattern undergoes displacement one of said detectors is subjected to light of increasing intensity and the other is simultaneously provided with light decreasing intensity to thereby provide said first and second signals; and wherein said drive means comprises a high gain servo feedback system coupled with said detector with said support means and operative to move said detectors in a direction to maintain the relative strength of said first and second signals constant.

5. A system as defined in claim 4 wherein said support return means returns said support means to an initial position after said pattern has been displaced by one fringe shift.

6. A system for detecting fringe shift of a radiant energy interference pattern comprising in combination: first and second photo detectors respectively positioned for the receipt of energy from first and second predetermined sections of said pattern; movable detector support means; drive means coupled electrically with said detectors and mechanically with said support means and responsive to signals from said detectors to move said support means in a direction to maintain said detectors in fixed positions relative to said pattern during movement of said pattern by a predetermined extent; and signal output means responsive to the extent of movement of said support means.

7. A system as defined in claim 6 wherein said predetermined extent corresponds to one fringe shift of said pattern and wherein said drive means operates after said support means has been moved said predetermined extent to return said detectors to a position for the receipt of energy from sections of the next following fringe corresponding to said predetermined sections of the preceding fringe.

8. A system as defined in claim 6 wherein said drive means comprises: an electrical bridge circuit including said detectors adapted to provide a control signal in response to said detectors being aligned other than to receive energy from said predetermined sections; amplifier means coupled with said bridge circuit; and electromagnetic drive means coupled with said support means and with said amplifier means and responsive to signals from said amplifier means to move said support means in a direction to reduce said control signal.

9. A system as defined in claim 6 wherein said signal output means includes counter means.

10. A system as defined in claim 7 wherein said detectors are positioned on opposite sides of a line in the pattern and each is positioned midway between a maximum and minimum of light intensity.

11. A system for detecting the displacement of an interference pattern of light composed of light and dark lines of maximum and minimum light intensity caused by constructive and destructive interference comprising in combination: first and second photo detectors; movable detector support means having a first position and holding said detectors in predetermined positions between different adjacent light and dark lines in said pattern when said support means is in its said first position; an electrical bridge circuit including said detectors in different arms thereof; support drive means coupled with said detector support means and responsive to applied control signals to move said support means; signal amplification means coupled with said bridge circuit and with said support drive means and adapted to apply said control signals to said drive means in response to signals derived from said bridge circuit, said drive means being responsive to said control signals to move said detectors in a direction to maintain the same in said predetermined positions relative to said pattern; limit switch means positioned for actuation by said support means after said support means has moved a predetermined distance in either direction from its said first position; circuit means responsive to actuation of said limit switch means to disable said drive means; means yieldingly urging said support means toward said first position; and signal output means coupled with said amplification means providing an output signal proportional to said control signals.

12. A system as defined in claim 11 and including counter means adapted to count the number of times said limit switch means is actuated.

13. A system as defined in claim 11 wherein said predetermined distance corresponds to one fringe shift of said pattern and wherein said predetermined positions of said detectors corresponds to said detectors being disposed on opposite sides of the same line in said pattern and each midway between areas of maximum and minimum light intensity.

References Cited

UNITED STATES PATENTS

| Re. 20,823 | 8/1938 | Goodwin | 250—210 |
|---|---|---|---|
| 3,114,046 | 12/1963 | Cabaniss et al. | 250—237 |
| 3,122,601 | 2/1964 | Williams | 88—14 |
| 3,127,465 | 3/1964 | Stephens | 88—14 |

RALPH G. NILSON, *Primary Examiner.*

M. ABRAMSON, *Assistant Examiner.*